Figure 1:
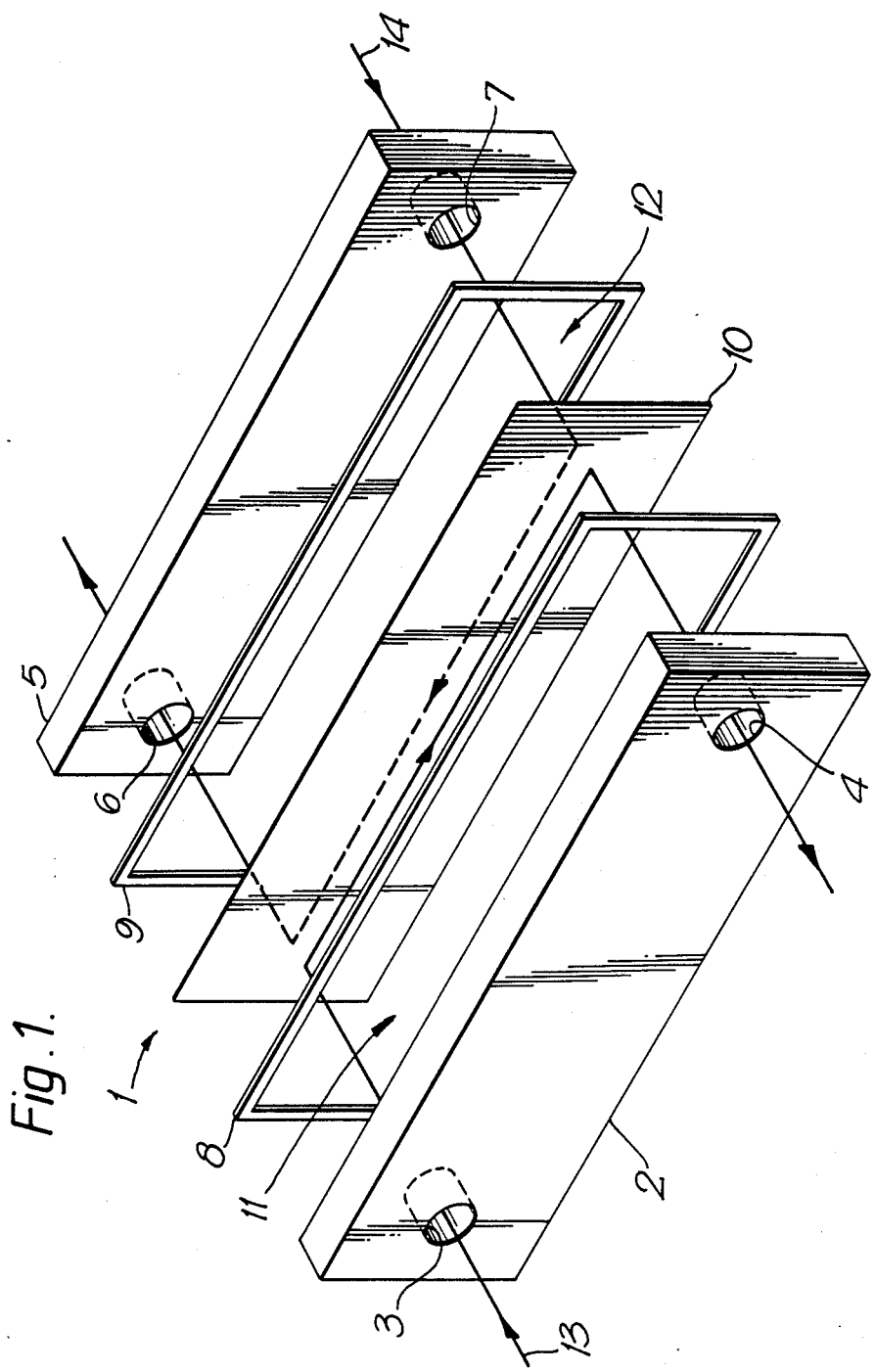

United States Patent [19]

Kelham

[11] Patent Number: 4,857,200
[45] Date of Patent: Aug. 15, 1989

[54] DECHLORINATION OF AQUEOUS ALKALI METAL CHLORIDE SOLUTION

[75] Inventor: Stephen F. Kelham, Appleton, Great Britain

[73] Assignee: Imperial Chemical Industries PLC, London, England

[21] Appl. No.: 50,546

[22] Filed: May 18, 1987

[30] Foreign Application Priority Data

May 23, 1986 [GB] United Kingdom ............ 8612627

[51] Int. Cl.$^4$ ........................................... B01D 13/00
[52] U.S. Cl. .................................. 210/651; 210/188
[58] Field of Search ................ 210/644, 321.2, 188, 210/651; 204/128, 98, 282, 283

[56] References Cited

U.S. PATENT DOCUMENTS

| | | | |
|---|---|---|---|
| 3,397,141 | 8/1968 | Hakai | 210/644 X |
| 3,456,112 | 5/1976 | Lee et al. | 210/644 |
| 3,673,067 | 6/1972 | Harwood et al. | 210/644 X |
| 4,202,772 | 5/1980 | Goldstein. | |
| 4,251,335 | 2/1981 | Bergher et al. | 204/128 X |
| 4,443,307 | 4/1984 | Moore et al. | |

FOREIGN PATENT DOCUMENTS

| | | |
|---|---|---|
| 0003495 | 8/1979 | European Pat. Off. . |
| 60-064603A | 4/1985 | Japan . |
| 2014868 | 9/1979 | United Kingdom . |
| 2025256 | 1/1980 | United Kingdom . |

OTHER PUBLICATIONS

Imal, Masano, et al., Separation of Volatile Materials by Gas Membranes, American Chemical Society, 1982, pp. 421-426.

*Primary Examiner*—Frank Spear
*Attorney, Agent, or Firm*—Cushman, Darby & Cushman

[57] ABSTRACT

A process for dechlorinating a chlorine-containing aqueous solution of an alkali metal chloride which process comprises contacting the solution with a face of a porous membrane of a hydrophobic material and contacting an aqueous liquid with an opposite face of said membrane. The porous membrane may be a porous film of polytetrafluoroethylene.

15 Claims, 2 Drawing Sheets

DECHLORINATION OF AQUEOUS ALKALI METAL CHLORIDE SOLUTION

This invention relates to a process for removal of chlorine, that is for dechlorinating, an aqueous chlorine-containing solution of an alkali metal chloride, and in particular to a process for dechlorinating a chlorine-containing aqueous alkali metal chloride solution which has been discharged from an electrolytic cell, for example, from an electrolytic cell of the mercury type or from a cell of the substantially hydraulically impermeable ion-exchange membrane type.

Chlorine is produced on a vast scale throughout the world by the electrolysis of aqueous alkali metal chloride solution, particularly by the electrolysis of aqueous sodium chloride solution.

The electrolytic cell in which such electrolysis is effected may be of the mercury type. In operation of such an electrolytic cell the solution is electrolysed between anodes, which may be graphite or of a suitable metal, and a flowing mercury cathode. Aqueous alkal metal chloride solution is charged to the electrolytic cell, and chlorine, depleted chlorine-containing aqueous alkali metal chloride solution, and alkali metal amalgam, are discharged from the cell. The amalgam is subsequently reacted with water in a so-called denuder to produce hydrogen and an aqueous alkali metal hydroxide solution, and the depleted amalgam is returned to the electrolytic cell. The chlorine-containing depleted aqueous alkali metal chloride solution is dechlorinated and discharged to waste, or is dechlorinated, resaturated with alkali metal chloride, treated to remove multivalent metal ions, and returned to the electrolytic cell.

The electrolysis may be effected in an electrolytic cell of the hydraulically impermeable ion-exchange membrane type which comprises a plurality of anodes and cathodes with each anode being separated from the adjacent cathode by a hydraulically impermeable ion-exchange membrane which divides the electrolytic cell into a plurality of anode and cathode compartments. The anode compartments of such a cell are provided with means for charging aqueous alkali metal chloride solution to the cell, suitably from a common header, and with means for removing products of electrolysis from the cell. Similarly, the cathode compartments of the cell are provided with means for removing products of electrolysis from the cell, and optionally with means for charging water or other fluids to the cell, suitably from a common header. In operation of such an electrolytic cell aqueous alkali metal chloride solution is charged to the anode compartments of the cell and chlorine produced in the electrolysis and chlorine-containing depleted aqueous alkali metal chloride solution are removed from the anode compartments, alkali metal ions are transported across the membranes to the cathode compartments of the cell to which water or dilute alkali metal hydroxide solution is charged, and hydrogen and alkali metal hydroxide solution produced by the reaction of alkali metal ions with water are removed from the cathode compartments of the cell. As is the case with an electrolytic cell of the mercury type the chlorine- containing depleted aqueous alkali metal chloride solution is dechlorinated and discharged to waste, or is dechlorinated, resaturated with alkai metal chloride, treated to remove multivalent metal ions, and returned to the electrolytic cell.

For a number of reasons it is desirable, or even necessary, to remove chlorine from a chlorine-containing aqueous alkali metal chloride solution discharged from an electrolytic cell. Thus, even where the solution is to be discharged to waste as an effluent without re-use the chlorine present in the solution would present an unacceptable environmental problem if it was not removed from the solution. Where the solution is to be resaturated with alkali metal chloride and returned to the electrolytic cell polyvalent metal ions, e.g. alkaline earth metal ions, are removed from the solution by reacting the solution with sodium carbonate and sodium hydroxide in order to precipitate the multivalent metals as insoluble hydroxides and carbonates. If the chlorine was not removed from the solution prior to such treatment it would react with the sodium hydroxide to form corrosive sodium hypochlorite in the solution. Furthermore, and in particular where the aqueous alkali metal chloride solution is to be electrolysed in a membrane type cell, it is necessary to further treat the solution with an ion-exchange resin in order to reduce still further the concentration of multivalent metal ions in the solution. Chlorine present in the solution would have an adverse effect on the ion-exchange resin. Also, chlorine present in the solution would present an operational hazard to plant operators should the solution be resaturated with alkali metal chloride in open vessels. The chlorine which is present in the aqueous alkali metal chloride solution may also represent a significant proportion of the chlorine produced in the electrolysis and it is desirable that this chlorine should be recovered.

Dechlorination of the chlorine-containing aqueous alkali metal chloride solution may be effected in a number of different ways. For example, dechlorination may be effected by passing or drawing air through the solution, for example in a packed tower, or the chlorine may be caused to flash off by application of reduced pressure to the solution, or the chlorine may be removed from the solution by application of reduced pressure and by passing or drawing air through the solution. Such processes have been practised for many years. In a more recent development there has been described in European Patent Application 0 044145A a process in which aqueous alkali metal chloride solution is dechlorinated in an apparatus comprising a nozzle for converting pressure energy of a liquid into kinetic energy, at least one desorption tube extending from the nozzle and having a gas-tight connection thereto and having an inlet end of the same or of larger cross-sectional area than that of the outlet of the nozzle, and a vessel connected to the outlet end of the desorption tube and having a gas-tight connection thereto, the vessel being equipped with means for removing chlorine and aqueous solution therefrom, the process comprising causing pressurised chlorine-containing aqueous alkali metal chloride solution to issue from the nozzle in the form of a jet which diverges downstream of the nozzle and which comes into contact with the entire inner periphery of a part of the desorption tube to seal a totally enclosed space between the jet and the desorption tube, and then to pass to the vessel, and removing from the vessel chlorine and dechlorinated solution.

The present invention relates to a process in which chlorine-containing aqueous alkali metal chloride solution is dechlorinated in an apparatus which is of simple construction and which does not depend on the use of a reduced pressure nor on the use of aqueous alkali metal chloride solution under elevated pressure.

According to the present invention there is provided a process for dechlorinating a chlorine-containing containing aqueous solution of an alkali metal chloride which process comprises contacting the solution with a face of a porous membrane of a hydrophobic material and contacting an aqueous liquid with an opposite face of the membrane.

In the process of the invention the aqueous alkali metal chloride solution is said to be dechlorinated. Use of the words "dechlorinated" or "dechlorination" is not meant to imply that in the process the aqueous alkali metal chloride solution is completely freed of chlorine, merely that the concentration of chlorine in the solution is reduced. The extent of the reduction of the concentration of chlorine in the solution will depend on a number of factors which will be discussed hereafter.

In the process of the invention the chlorine-containing aqueous alkali metal chloride solution is contacted with one face of the porous membrane and an aqueous liquid is contacted with an opposite face of the membrane. The porous membrane is made of a hydrophobic material and in operation of the process chlorine is transferred through the pores of the membrane from the aqueous alkali metal chloride solution to the aqueous liquid. As the membrane is hydrophobic there is little or no transference of the aqueous solution or of the aqueous liquid across the membrane. The aqueous liquid is itself not necessarily free of chlorine, although the concentration of any chlorine which may be present in the aqueous liquid should be lower than the concentration of chlorine in the aqueous alkali metal chloride solution.

The membrane which is used in the process of the invention is suitably in the form of a film or sheet, that is in a form which has two faces each of substantial surface area and with which the aqueous alkali metal chloride solution and the aqueous liquid may be contacted. The thickness of the membrane is not particularly critical. It may, for example, have a thickness in the range 1 micron to 10 mm, e.g. in the range 100 microns to a few mm, e.g. 3 mm. The membrane is porous at least to the extent that it is permeable to gaseous chlorine, and it may have a widely-varying porosity, for example, a porosity of as low as 10%, that is 10% of the volume of the membrane may be comprised of pores, or it may have a porosity of as high as 90%, although in general the porosity will be in the range 30% sizes of the pores in the membrane may vary over a wide range provided that, for a particular material of construction of the membrane and for a membrane of a given thickness and porosity, the sizes of the pores are not so great that the membrane becomes permeable to the aqueous alkali metal chloride solution or to the aqueous liquid. Indeed, the properties of the membrane are to some extent interactive in that, for a given hydrophobic material, the porosity, the sizes of the pores and thickness of the membrane should be chosen to achieve the desired effect of transference of chlorine across the membrane from the chlorine-containing aqueous alkali metal chloride solution to the aqueous liquid with little or no transference of the solution or of the liquid across the membrane.

The membrane is made of a hydrophobic material, that is of a material which is not wetted to any substantial extent by the chlorine-containing aqueous alkali metal chloride solution nor by the aqueous liquid. Suitable hydrophobic materials are fluorine-containing organic polymeric materials, including a tetrafluoroethylene/hexafluoropropylene copolymer, and polyvinylidene fluoride. A preferred hydrophobic material is polytetrafluoroethylene, and a particularly suitable membrane for use in the process of the invention is a porous membrane in the form of a film made of polytetrafluoroethylene and sold under the trade name, "Gore-Tex" by W L Gore and Associates Inc. This membrane is made by rapid stretching of a sheet of polytetrafluoroethylene in order to create porosity, followed by heat treatment in order to sinter the polytetrafluoroethylene in the resultant porous film.

The process of the invention may be effected in an apparatus which comprises a pair of compartments separated by a porous membrane, a first compartment being provided with means for charging chlorinecontaining aqueous alkali metal chloride solution thereto and with means for removing dechlorinated aqueous alkali metal chloride solution therefrom, and a second compartment being provided with means for charging aqueous liquid thereto and with means for removing chlorine-containing aqueous liquid therefrom. The means for charging and removing the solution and the liquid from the compartments may be provided by suitable ports in the walls of the compartments. The compartments suitably have a relatively small dimension in a direction perpendicular to the membrane such that the aqueous solution and the aqueous liquid in the compartments is in the form of a relatively thin film. The apparatus may thus have the form of a filter press, and the compartments may, for example, have a dimension of 0.2 mm to 10 mm, e.g. 1 mm to 10 mm, in a direction perpendicular to the membrane.

The effectiveness of the apparatus in dechlorinating the aqueous alkali metal chloride solution depends on the surface area of the membrane with which the aqueous solution and the aqueous liquid are in contact, and on the time for which the solution and the liquid are in contact with the membrane. In a preferred embodiment each compartment may be provided with a baffle or a plurality of baffles, or a channel or a plurality of channels which serve to direct the flow of aqueous alkali metal chloride solution, and of aqueous liquid, in an extended path over the surfaces of the porous membrane thus prolonging the contact between the membrane and the solution and the liquid and thus increasing the extent of transference of chlorine across the porous membrane. The chlorine-containing aqueous alkali metal chloride solution is preferably caused to flow through the apparatus, and it is also preferred that the solution, and the aqueous liquid, flow through the apparatus in a counter-current manner. It may be necessary to dechlorinate large volumes of aqueous akali metal chloride solution discharged from an electrolytic cell, and in order that the required amount of dechlorination may be effected the apparatus may need to comprise a porous membrane of substantial surface area. Furthermore, if the apparatus was to consist of a single pair of compartments separated by a porous membrane the apparatus may need to be of excessive size, and in particular to have large overall dimensions of height and length. In order that the apparatus should not have such large overall dimensions it is preferred that the apparatus comprises a plurality of pairs of compartments each pair being separated by a porous membrane. The compartments may take the form of a filter press. The first compartments of the pairs of compartments may be in communication, e.g. by means of apertures in the walls of the compartments, and the second compartments of the pairs of compartments may be in communication, e.g. by means of apertures in the walls of the compartments. In use of this preferred form f apparatus the chlorine-containing aqueous alkali metal chloride solution may be passed through the first compartments sequentially and dechlorinated aqueous alkali metal chloride solution may be removed therefrom, and the aqueous liquid may be passed through the second compartments sequentially and the chlorine-containing aqueous liquid may be removed therefrom. The flow of the solution and liquid through the compartments of the apparatus is preferably countercurrent. Such a preferred form of apparatus, particularly when in the form of a filter press, may be associated with, e.g. affixed to, an electrolytic cell of the filter press type.

The process of the invention may be used to dechlorinate any chlorine-containing aqueous alkali metal chloride solution, e.g. a solution of potassium chloride, but it will most generally be used to dechlorinate a solution of sodium chloride.

The process of the invention may be operated with a chlorine-containing alkali metal chloride solution discharged from any type of electrolytic cell, but in general it will be operated with such solutions discharged from electrolytic cells of the mercury or membrane type, as hereinbefore described. Such electrolytic cells are well-known and it is not necessary to describe the construction of such electrolytic cells in detail.

The concentration of chlorine in an aqueous alkali metal chloride solution discharged from an electrolytic cell and which is to be dechlorinated in the process of the invention will depend on a number of factors, for example on the temperature of the solution and on the pressure in the electrolytic cell at which electrolysis is effected. The higher the temperature at which electrolysis is effected, the lower will be the concentration of chlorine in the solution. Conversely, the higher the pressure at which electrolysis is effected the greater will be the concentration of chlorine in the solution. Electrolysis is usually effected at a temperature in the range 70° C. to 95° C. In a mercury type electrolytic cell the pressure is usually slightly below atmospheric pressure, whereas in a membrane-type electrolytic cell the pressure may be about atmospheric pressure or it may be above atmospheric. The concentration of chlorine in the solution discharged from the electrolytic cell may be of the order of 1% by weight, but it may be greater, particularly where electrolysis has been effected at a pressure above atmospheric. The concentration of chlorine in the solution may lower, e.g. of the order of 0.2% by weight. Prior to treatment in the process of the invention acid, e.g. hydrochloric acid, may be added to the chlorine-containing aqueous sodium chloride solution in order to convert to chlorine hypochlorous acid which may be present in the solution.

In the process of the invention it is desirable to reduce the concentration of chlorine in the sodium chloride solution to as low a value as possible, and preferably to a concentration to less than 100 parts per million (ppm), more preferably less than 10 ppm.

The aqueous liquid which is used in the process of the invention and to which chlorine is transferred may be water. However, it may itself be an aqueous alkali metal chloride solution. For example, it may be such a solution which has been dechlorinated in the process of the invention and which has subsequently been resaturated with alkali metal chloride and which has optionally been treated to remove polyvalent metal ions. The resultant chlorine-containing aqueous alkali metal chloride solution may be returned to the electrolytic cell for electrolysis.

In order that the dechlorination process may operate at high efficiency it is preferred to operate the process at as high a temperature as possible, that is with chlorine-containing aqueous alkali metal chloride solution and aqueous liquid at as high a temperature as possible, e.g. at a temperature in the range 70° C. to 95° C.

In an alternative form of apparatus in which to effect the process of the invention the porous membrane of a hydrophobic material may be in the form of a tube or a plurality of tubes or hollow fibres, and the process may be effected by passing chlorine-containing aqueous alkali metal chloride solution through the tube or tubes, or fibres, and the aqueous liquid over the outer face of the tube or tubes, or fibres. Alternatively, the positions of the aqueous solution and of the aqueous liquid may be reversed. This form of apparatus may have the form of a tubular heat exchanger.

Prior to use in the process of the invention the chlorine-containing aqueous alkali metal chloride solution may be subjected to a preliminary partial dechlorination, e.g. by application of a reduced pressure and/or by passing air through the solution.

Figure 2:
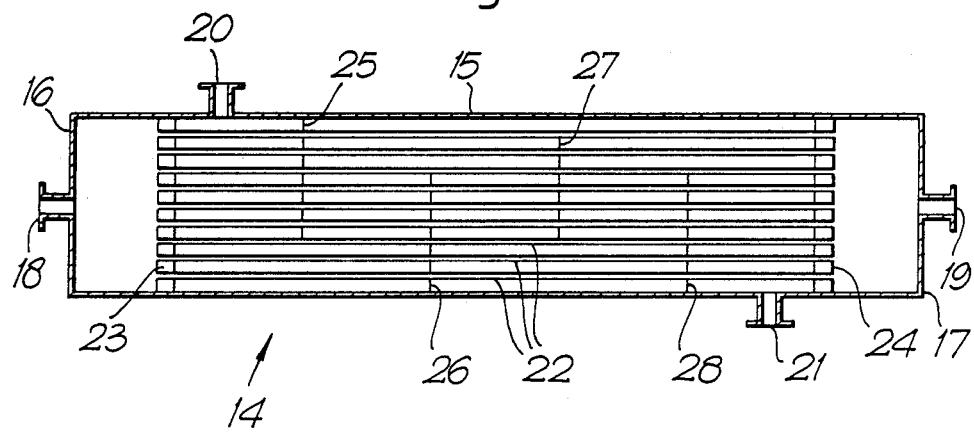

The process of the invention is illustrated by reference to the following figures in which FIG. 1 shows an isometric exploded view of an apparatus in which the process of the invention may be effected, and FIG. 2 shows an alternative form of apparatus in which the process of the invention may be effected.

FIG. 1 shows an apparatus 1 comprising an end plate 2 of a plastics material, which may be an acrylonitrile-butadiene-styrene copolymer, the end plate 2 comprising two apertures 3, 4. The apparatus also comprises an end plate 5 of a plastics material having two apertures 6, 7. Between the end plates 2, 5 there are positioned two frame-like gaskets 8, 9, also of plastics material, and a porous hydrophobic membrane in the form of a film of polytetrafluoroethylene 10 is positioned between the gaskets 8, 9. The porous hydrophobic membrane 10 is a material sold under the trade name "Gore-Tex" by W L Gore and Associates Inc. The membrane overlaps the facing surfaces of the gaskets 8, 9 but does not necessarily entirely cover the facing surfaces of the gaskets.

The apparatus is assembled by positioning the membrane 10 between the gaskets 8, 9, and sealing the gaskets 8, 9 to each other by use of an adhesive or by heat sealing. The gaskets 8, 9 are then sealed to the end plates 2, 5 respectively, also by use of an adhesive or by heat sealing. The assembled apparatus comprises two compartments 11, 12.

The aperture 3 is connected to a source of chlorine-containing aqueous alkali metal chloride solution, for example, to the outlet header from the anode compartments of an electrolytic cell, and the aperture 4 is connected to a stock tank for the aqueous alkali metal chloride solution which has been treated in the apparatus. The aperture 7 is connected to a source of aqueous liquid, for example to a source of chlorine-free aqueous alkali metal chloride solution, and aperture 6 is connected to a stock tank for the aqueous liquid which has passed through the apparatus.

In operation chlorine-containing aqueous alkali metal chloride solution is charged to compartment 11 via aperture 3, the solution is passed through the compartment in the direction indicated by the arrowed line 13, and dechlorinated aqueous alkali metal chloride solution is removed from the compartment via aperture 4. Aqueous liquid is charged to compartment 12 via aperture 7, the aqueous liquid is passed through the compartment in the direction indicated by the arrowed line 14, and chlorine-containing aqueous liquid is removed from the compartment via aperture 6.

FIG. 2 shows an apparatus 14 comprising a tube 15 of a plastics material having end walls 16, 17. The end walls are provided with ports 18, 19 respectively, and the tube 15 is provided with ports 20, 21. Inside the tube 15 there are positioned a plurality of tubes 22 of a porous hydrophobic material, for example of porous polytetrafluoroethylene, the tubes 22 being held in position by plates 23, 24. The apparatus also comprises a plurality of baffles 25, 26, 27, 28.

In operation chlorine-containing aqueous alkali metal chloride solution is charged to the apparatus via port 19, the solution passes along the tubes of porous hydrophobic material 22 and dechlorinated aqueous alkali metal chloride solution is removed from the apparatus via port 18. Aqueous liquid is charged to the apparatus via port 20, the aqueous liquid contacts the outside surfaces of the tubes of porous hydrophobic material 22, and chlorine-containing aqueous liquid is removed from the apparatus vi port 21.

In a specific example of the operation of the process aqueous sodium chloride solution containing about 500 mg/1 of chlorine was dechlorinated in an apparatus of the type shown generally in FIG. 1. The overall external dimensions of the apparatus were 25 cm×15 cm, and the compartments 11 and 12 comprised baffles positioned vertically across the gaskets 8, 9 but which are not shown in FIG. 1. These baffles defined channels of width 5 mm and depth 1 mm, the total length of the channel in each of compartments 11 and 12 being 380 cm. (In operation the aqueous solution and the aqueous liquid were caused to pass progressively from one end of a channel to the other). The gaskets 8 and 9 were 1 mm thick and thus each of compartments 11 and 12 had a depth of 1 mm. The porous polytetrafluoroethylene membrane 10 had a thickness of 80 microns, an overall porosity of 78%, and an average pore diameter of 0.2 micron, and the membrane was reinforced with a polypropylene scrim.

In operation of the process of the invention depleted aqueous sodium chloride solution removed from a membrane cell and containing about 500 mg/1 of chlorine was passed at a rate of 6 1 liters/hr through the channel in compartment 11. The temperature of the solution when charged to the compartment was 70° C. Saturated aqueous sodium chloride solution free of chlorine and at a temperature of 60° C. was passed at a rate of 7.5 liters/hr through the channel in compartment 12. The solution removed from compartment 12 was found to have a chlorine concentration about 200 mg/1, this chlorine having been transferred across the porous membrane 10 from the solution in compartment 11. The extent of the dechlorination of the depleted aqueous sodium chloride solution could be increased by repeating the dechlorination process, that is by passing the solution through a further compartment 11 and contacting it with another porous membrane 10 which is itself in contact with a chlorine-free saturated aqueous sodium chloride solution in a further compartment 12.

I claim:

1. A process for dechlorinating a chlorine-containing aqueous solution of an alkali metal chloride which process comprises contacting the solution with a face of a porous membrane of a hydrophobic material and contacting an aqueous liquid with an opposite face of the membrane.

2. A process as claimed in claim 1 in which the porous membrane is in the form of a film or sheet.

3. A process as claimed in claim 2 in which the film or sheet of the porous membrane has a thickness in the range 1 to 1000 microns.

4. A process as claimed in any one of claims 1 to 3 in which the porous membrane has a porosity in the range 10% to 90%.

5. A process as claimed in claim 1 in which the hydrophobic material of the porous membrane comprises polytetrafluoroethylene.

6. A process as claimed in claim 1 which is effected in an apparatus which comprises a pair of compartments separated by a porous membrane, a first compartment being provided with means for charging chlorine-containing aqueous alkali metal chloride solution thereto and with means for removing dechlorinated aqueous alkali metal chloride solution therefrom, and a second compartment being provided with means for charging aqueous liquid thereto and with means for removing chlorine-containing aqueous liquid therefrom.

7. A process as claimed in claim 6 in which the compartments of the apparatus have a dimension of 0.2 to 10 mm in a direction perpendicular to the porous membrane.

8. A process as claimed in claim 6 in which the chlorine-containing aqueous alkali metal chloride solution and the aqueous liquid flow through the apparatus in a counter-current manner.

9. A process as claimed in claim 6 which is effected in an apparatus which comprises a plurality of pairs of compartments and in which the first compartment of each pair of compartments is separated from the second compartment of each pair of compartments by a porous membrane.

10. A process as claimed in claim 9 in which the first compartments of the pairs of compartments are in communication and in which the second compartments of the pairs of compartments are in communication.

11. A process as claimed in claim 6 in which the apparatus has the form of a filter press.

12. A process as claimed in claim 9 in which the chlorine-containing aqueous alkali metal chloride solution is passed through the first compartments sequentially and dechlorinated aqueous alkali metal chloride solution is removed therefrom, and aqueous liquid is passed through the second compartments sequentially and the chlorine-containing aqueous liquid is removed therefrom.

13. A process as claimed in claim 1 in which the aqueous liquid is water.

14. A process as claimed in claim 1 in which the aqueous liquid is an aqueous alkali metal chloride solution.

15. A process as claimed in claim 1 to which is operated at temperature in the range 70° C. to 95° C.

* * * * *